United States Patent [19]

Erickson

[11] Patent Number: 5,034,979
[45] Date of Patent: Jul. 23, 1991

[54] EARRING ADAPTER FOR TELEPHONE

[76] Inventor: Peggy J. Erickson, 11247 Oak, Apt. 201, Kansas City, Mo. 64114

[21] Appl. No.: 337,871

[22] Filed: Apr. 14, 1989

[51] Int. Cl.$^5$ ............................................. H04M 1/00
[52] U.S. Cl. .................................. 379/447; 379/450; D 14/250; D 14/249
[58] Field of Search ............... 379/447, 450, 433, 444; D 14/250, 249, 243; 24/303

[56] References Cited

U.S. PATENT DOCUMENTS

| D. 183,019 | 6/1958 | Porter | D 14/249 |
| D. 197,773 | 3/1964 | Ugartechea | 381/187 |
| 1,797,135 | 3/1931 | Fraschetti | 379/451 |
| 2,490,637 | 12/1949 | Kraepelien | 379/433 |
| 2,501,830 | 3/1950 | Ruml, Jr. | D 14/249 |
| 2,584,402 | 2/1952 | Volkmann | 381/187 |
| 3,231,688 | 1/1966 | Ugartechea | 379/447 |
| 4,570,038 | 2/1986 | Tinelli | 379/452 |
| 4,827,506 | 5/1989 | Kochan | 379/433 |

Primary Examiner—Jin F. Ng
Assistant Examiner—Jason Chan
Attorney, Agent, or Firm—Kokjer, Kircher, Bradley, Wharton, Bowman & Johnson

[57] ABSTRACT

A telephone earpiece attachment that accommodates users wearing earrings. The attachment may be mounted on the telephone handset by a hinge or by magnetic attraction. The attachment body holds the ear away from the earpiece with the ear lobe radially beyond the body so that no pressure is applied to the earring. The body provides a chamber through which sound is transmitted from the earpiece to the ear of the user.

8 Claims, 2 Drawing Sheets

U.S. Patent  July 23, 1991  Sheet 1 of 2  5,034,979
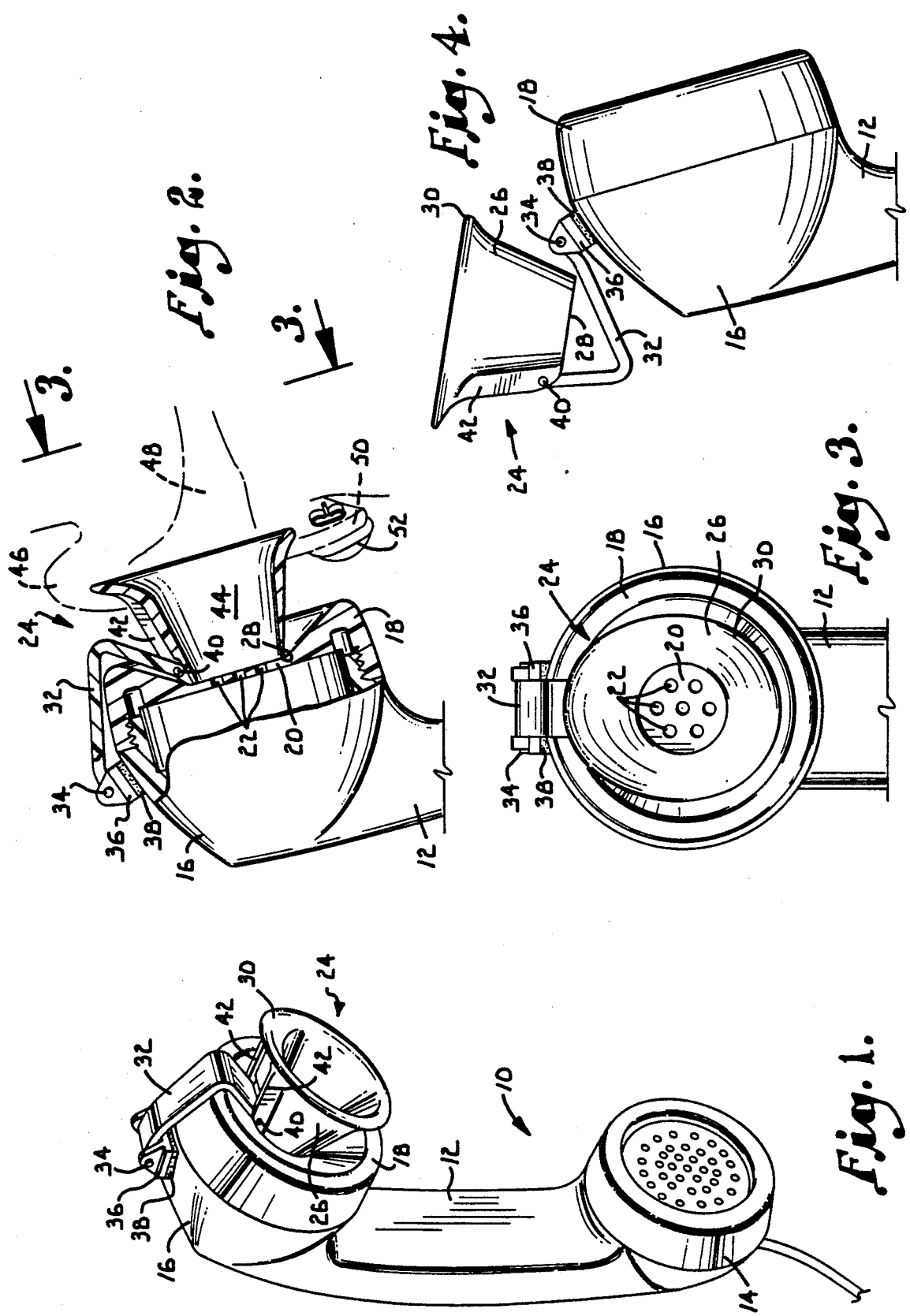

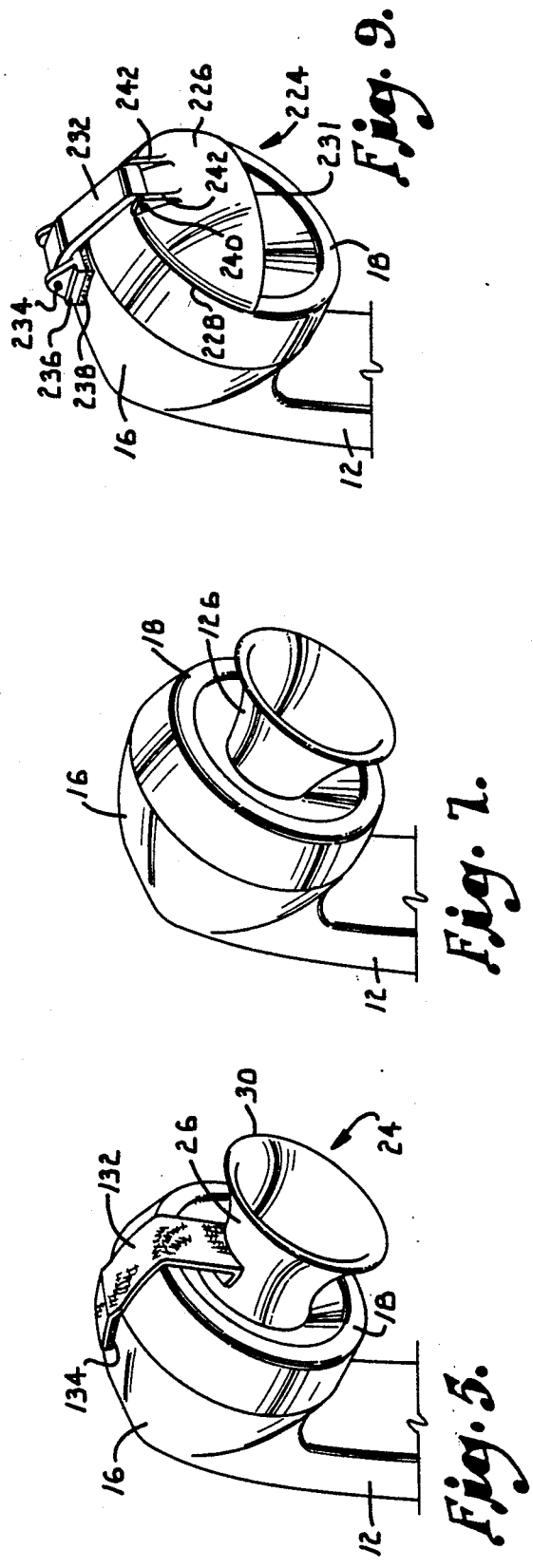
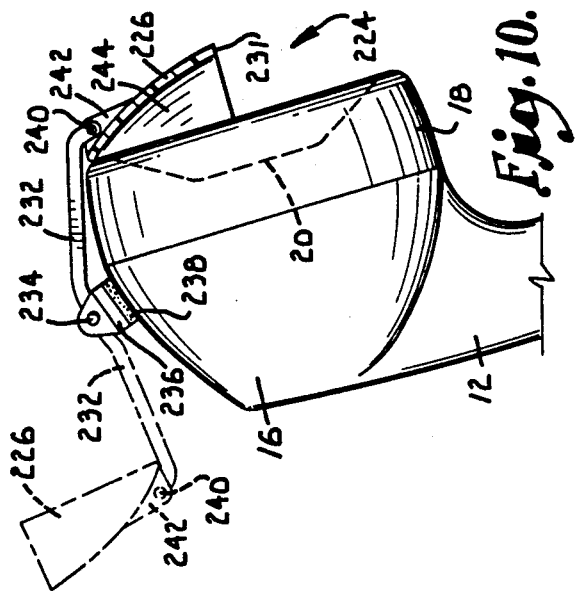
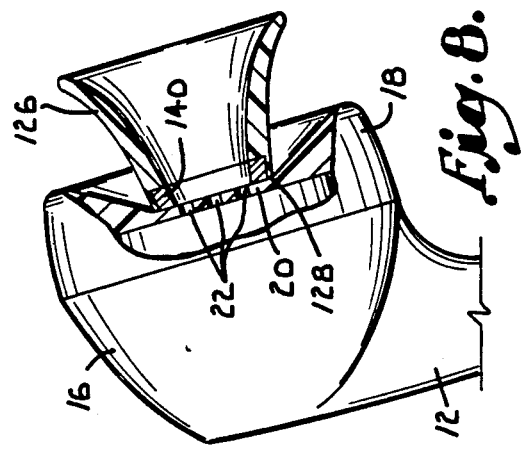
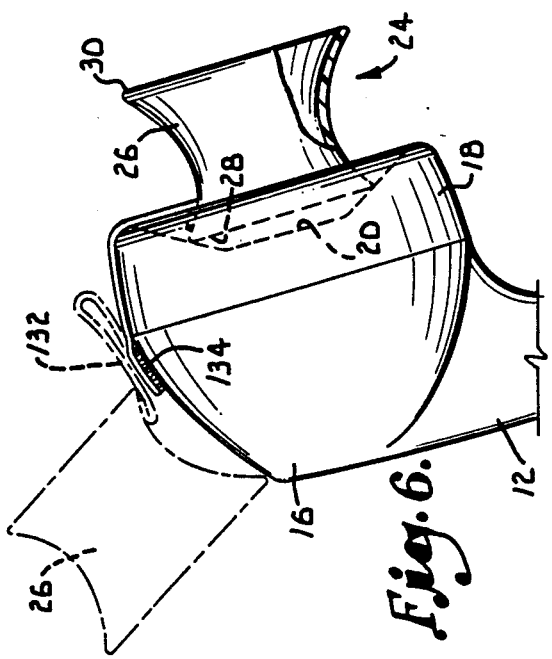

5,034,979

EARRING ADAPTER FOR TELEPHONE

BACKGROUND OF THE INVENTION

This invention relates in general to telephone receivers and more particularly to an attachment for a telephone handset which comfortably accommodates a telephone user wearing earrings.

The discomfort that accompanies application of a telephone receiver to an ear wearing an earring is well known. Because of the pressure of the telephone receiver against the earring, women commonly remove one of the earrings before using the telephone receiver. In addition to the inconvenience this causes, the earring that is removed can easily be lost.

This problem has been recognized, and various techniques have been proposed to allow the telephone receiver to be used while the earring remains in place on the ear lobe. For example, U.S. Pat. No. 3,231,688 to Ugartechea discloses a telephone earpiece having a recess into which the earring can fit in order to avoid the application of pressure to it. However, oversize earrings are too large to fit into the recess, and the size of the recess thus presents a limit as to the earring size that can be accommodated. In addition, the earpiece has a complicated shape which makes it difficult to produce and also detracts from its acoustical performance. Another drawback is that the device must be completely detached from the telephone receiver before the normal earpiece can be used. When the device is loose from the receiver, it can be lost or misplaced so that it is unavailable for use.

SUMMARY OF THE INVENTION

The present invention is directed to an improved telephone receiver attachment which is constructed to accommodate users wearing earrings of virtually any size and style and which avoids significant degradation of the acoustical properties of the receiver.

It is a particularly important feature of the invention that the attachment can be provided in different forms, depending upon the circumstances in which it is to be used. When permanent attachment to the telephone handset is appropriate, as may be the case on a telephone in the home or office, a permanently mounted device is provided. On the other hand, if only temporary attachment to the handset is appropriate, as for coin operated telephones or other telephones used by the public, a removable device may be carried in the purse, applied to the telephone handset when it is to be used, and removed and placed in the purse again after the telephone conversation has been completed.

It is another important object of the invention to provide a permanently mounted handset attachment which can be easily moved out of the way when the earpiece is to be used normally. This is accomplished by mounting the attachment by means of a hinge which allows it to be pivoted out of the way and yet remain on the handset where it is always available for use.

An additional object of the invention is to provide a portable handset attachment which is small enough to be carried in a purse.

A further object of the invention is to provide a handset attachment which transmits sound from the telephone earpiece to the ear canal of the user in an acoustically efficient manner while controlling extraneous external noise.

Among the other objects of the invention are to provide a handset attachment of the character described which is applicable to either ear without discomfort, which may be used safely without sanitary problems, which is constructed simply and economically and which exhibits aesthetic appeal.

DESCRIPTION OF THE DRAWINGS

In the accompanying drawings which form a part of the specification and are to be read in conjunction therewith and in which like reference numerals are used to indicate like parts in the various views:

FIG. 1 is a perspective view of a telephone handset which is equipped with an attachment constructed according to one embodiment of the present invention, with the attachment positioned on the handset earpiece for use;

FIG. 2 is a fragmentary side elevational view on an enlarged scale showing the attachment of FIG. 1 applied to the ear of a user of a telephone, with portions shown in section for purposes of illustration;

FIG. 3 is a fragmentary front elevational view taken generally along line 3—3 of FIG. 2 in the direction of the arrows;

FIG. 4 is a fragmentary side elevational view similar to FIG. 2, but shown with the attachment pivoted out of the way so that the normal telephone earpiece can be used;

FIG. 5 is a fragmentary perspective view of a telephone handset which is equipped with an attachment mounted on the handset by means of flexible hinge strap in accordance with another embodiment of the invention, with the attachment positioned on the handset earpiece for use;

FIG. 6 is a fragmentary side elevational view showing the attachment of FIG. 5 on the telephone handset, with a portion shown in section for purposes of illustration and the broken lines indicating the attachment moved to an out of the way position so that the normal earpiece can be used;

FIG. 7 is a fragmentary perspective view showing a telephone handset equipped with an attachment constructed according to still another embodiment of the invention;

FIG. 8 is a side elevational view of the attachment shown in FIG. 7 applied to the telephone handset, with portions shown in section for illustrative purposes;

FIG. 9 is a fragmentary perspective view showing a telephone handset which is equipped with an attachment constructed according to yet another embodiment of the invention, with the attachment positioned on the handset earpiece for use; and FIG. 10 is a fragmentary side elevational view showing a handset equipped with the attachment of FIG. 9, with a portion shown in section for illustrative purposes and the broken line illustrating the attachment moved to an out of the way position so that the normal telephone earpiece can be used.

DETAILED DESCRIPTION OF THE INVENTION

Referring now to the drawings in more detail and initially to FIGS. 1-4, numeral 10 generally designates a telephone receiver handset of conventional construction. The handset 10 includes a handle 12, a transmitter 14 at one end of the handle 12 and a receiver 16 at the other end of the handle 12. The receiver 16 has an earpiece 18 which is threaded onto the receiver body. The earpiece 18 includes a circular face portion 20 which is provided with a plurality of circular openings 22 through which sound is transmitted. The face portion 20 is concave and includes a flat, circular center and an inclined peripheral portion which extends from the center of the periphery of the earpiece 18.

In accordance with the first embodiment of the present invention (shown in FIGS. 1-4) the handset 10 is equipped with an attachment which is generally identified by reference numeral 24 and which serves the purpose of allowing the handset 10 to be used while an earring remains in place on the ear lobe of the user. The body of the attachment 24 is a flared tube 26. The tube 26 has a circular inner edge 28 which has substantially the same diameter as the flat center part of the face portion 20 of earpiece 18. The edge 28 is also large enough to surround all of the openings 22 when applied to the face 20 in the manner shown in FIG. 2. The tube 26 gradually increases in diameter away from the inside edge 28 and terminates in a flared outer end which presents a rim 30 having configuration that may be circular or oval.

The attachment 24 is mounted on the handset 12 by a hinge mechanism which includes a rigid hinge arm 32 bent generally into the shape of an L. One end of the arm 32 is pivoted at 34 to a mounting bracket 36. The bracket 36 is secured to a mounting pad 38 which is in turn glued or otherwise permanently mounted on the receiver 16 at a location on top of the receiver slightly behind the earpiece 18. The opposite or outer end of the hinge arm 32 is pivoted at 40 between a pair of ribs 42 located on top of the tube 26.

The mounting of tube 26 by means of the hinge arm 32 and the pivot pins 34 and 40 permits the tube to be pivoted between the position shown in FIG. 2 and the position shown in FIG. 4. In the first position, (FIG. 2), the inner edge 28 of tube 26 is in continuous contact with the face portion 20 such that all of the openings 22 register with a chamber 44 which extends through the tube from the inner end 28 to the outer rim 30. The ear 46 of the user of the telephone can then be applied to the rim 30 such that the ear canal 48 is located within the rim 30 and the ear lobe 50 located well beyond the tube 26 in a direction radially of the face portion 20 of the earpiece, as shown in FIG. 2.

The ear lobe 50 is thus held well away from the earpiece 18 by the tube 26, and an earring 52 which is mounted on the ear lobe 50 is likewise held away from the earpiece so that the handset does not apply pressure against the earring or otherwise cause discomfort to the ear lobe. Since the ear lobe 50 is located outwardly well away from the rim 30, even oversized earrings can be worn without the tube contacting them or otherwise creating discomfort.

It is also noted that the rim 30 provides a seal against the ear 46 substantially completely around the ear canal 48. In addition, the inner edge 28 of tube 26 contacts the face portion 20, and all of the sound transmissional openings 22 are inside of the edge 28 so that the sound which is transmitted through the openings is able to pass through the chamber 44 and into the ear canal 48. At the same time, extraneous external noise is effectively sealed out of the sound path by reason of the fit of the inner edge 28 and the rim 30 against the earpiece and ear, respectively. As a consequence, use of the attachment 24 does not result in appreciable degradation of the acoustical properties of the telephone receiver 16.

In the second or out of the way position of the attachment 24 (FIG. 4), the tube 26 is displaced from the earpiece 18 and is located above the receiver 16 where it does not obstruct the earpiece 18 or its face portion 20. Therefore, the telephone receiver can be applied to the ear in the normal way with the attachment 24 moved to the out of the way position shown in FIG. 4.

In this manner, the attachment 24 is mounted permanently on the handset 10 and is always available for use if so desired. At the same time, the device can easily be moved out of the way so that the earpiece 18 can be applied to the ear normally when it is desired to use the telephone handset in this normal manner.

FIGS. 5 and 6 show a modified embodiment of the invention in which the attachment 24 is constructed in substantially the same manner previously described except that the inner edge of the tube 26 may be flared somewhat such that it contacts the face portion 20 along its inclined part slightly beyond the flat area of the face portion.

The main difference in the embodiment of FIGS. 5 and 6 is that a different type of hinge mounting arrangement is used. A flexible hinge strap 132 is secured at one end to the top of the tube 26 and at the opposite end to the top of the receiver 16 at a location slightly behind the telephone earpiece 18. A mounting pad 134 may be adhesively secured to the receiver 16, and the corresponding end of the hinge strap 132 may be attached to the pad 134 by any convenient means such as conventional hook and loop type fasteners.

The hinge strap 132 mounts tube 26 on the handset for hinged movement between the positions shown in solid and broken lines in FIG. 6. In the solid line position, the tube 26 is in place on the earpiece 18 and functions in the same manner described in connection with the first embodiment of the invention. In the broken line position of FIG. 6, the hinge strap 132 is folded back on itself and tube 26 is displaced from the earpiece and is out of the way to permit the earpiece to be used without obstruction in the normal manner. Preferably, the surface of the strap 132 which folds back on itself is provided with mating hook and loop fastener which hold the strap in its folded over condition to prevent tube 26 from swinging freely when the handset is used normally. The tube 26 can be detached from the handset by pulling the strap 132 in order to disconnect the hook and loop fasteners which connect strap 132 to the mounting pad 134.

FIGS. 7 and 8 illustrate yet another embodiment of the invention in which a flared tube 126 is constructed in generally the same manner described previously for tube 26. However, rather than being hinged to the handset 10, the tube 126 is magnetically held in place on the earpiece on the face portion 20 of the earpiece 18. As shown in FIG. 8, a circular magnet 140 is secured to the tube 126 adjacent to its inner edge 128. The receiver 16 has sufficient ferromagnetic material to provide magnetic attraction that holds the magnet 140 in place on the face portion 20.

When tube 126 is in place on the earpiece 18, it functions in the same manner earlier described to accommodate a user wearing an earring. The tube 126 can be completely detached from the handset by pulling it with enough force to overcome the magnetic attraction. It is contemplated that the magnetically mounted tube 126 will be carried in the purse and applied to coin operated telephones and other publicly used telephones outside of the home or office where only a temporary attachment is practical. When the user is through using the telephone, she can detach the tube 126 and place it back in the purse.

A fourth and final embodiment of the invention is shown in FIGS. 9 and 10. In this embodiment, a handset attachment 224 has a body that takes the form of a curved shell member 226. The shell member 226 has a generally semi-circular inner edge 228 that may be applied generally against the rim portion of the earpiece 18. The shell member 228 has a curved outer surface that is spaced well outwardly from the face portion 20 and which is engaged against the ear of the user when the attachment 224 is used. The curved surface of the shell holds the ear away from the earpiece 18 and thus maintains the ear lobe and earring outwardly of the earpiece and well below a curved edge 231 that forms the bottom edge of the shell 226.

The shell 226 is mounted on the telephone handset by a hinge mechanism similar to that shown in FIGS. 1-4. A rigid hinge arm 232 is bent less drastically than arm 32. One end of arm 232 is pivotally connected at 234 to a mounting bracket 236. The bracket 236 is secured to a mounting pad 238 which is adhesively or otherwise suitably attached to the receiver 16. The opposite end of the hinge arm 232 is pivotally pinned at 240 between a pair of lugs 242 mounted on the shell member 226.

The hinge connection of shell 226 to the handset permits the shell to be moved between the positions shown in solid and broken lines in FIG. 10. In the solid line position, the ear may be applied to the shell 226 such that the ear canal is located immediately below edge 231 in communication with a chamber 244 which is presented between the shell and the earpiece 18. It is noted that the chamber 244 is in communication with the openings 22 so that the sound that is transmitted through the openings can pass through the chamber 244 to the ear canal. In the broken line position of FIG. 10, the shell 226 is displaced from the earpiece 18 to an out of the way position so that the earpiece can be applied to the ear in the usual way if desired.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. An attachment for a telephone handset which includes an earpiece having a circular face portion presenting openings therein for sound transmission, said attachment comprising:
    a body configured to present a chamber through which sound may be transmitted;
    hinge means comprising a rigid arm having first and second ends respectively pivotally connected with the handset and the body, the arm being bent between the ends thereof for mounting said body on the handset in a manner permitting the body hinged movement between a first position wherein said chamber is adjacent the face portion to permit sound from the openings to pass through the chamber and a second position wherein said body is displaced from the face portion, said body being disposed to be engaged by the ear of a user when said body is in the first position thereof with the ear held away from the face portion by said body and with the ear canal adjacent said chamber to receive sound therefrom;
    said body being sized and configured to engage the handset in the first position only within the confines of the face portion.

2. The attachment of claim 1, wherein said body comprises a tube member having an inner end disposed against the face portion in said first position and a flared outer end terminating in a rim to which the ear of the user may be applied with the ear canal situated within the rim and the ear lobe situated outside of the rim, said chamber extending between the inner and outer ends of said tube member.

3. An attachment for a telephone handset which includes an earpiece having a circular face portion presenting openings therein for sound transmission, said attachment comprising:
    a body configured to present a chamber through which sound may be transmitted;
    means comprising an elongated bent rigid arm pivotally coupled at its ends to the body and handset respectively for mounting said body on the handset for hinged movement between a first position wherein said chamber is adjacent the face portion to permit sound from the openings to pass through the chamber and a second position wherein said body is displaced from the face portion, the body being disposed so that the ear of a user may be applied against said body in the first position thereof with the ear held away from the face portion by said body and with the ear canal adjacent said chamber to receive sound therefrom;
    said body being configured and sized so that in the first position with the user's ear applied to the body, the lobe of said ear is disposed outside the body.

4. The attachment of claim 3, wherein said body comprises a tube member having an inner end disposed against the face portion in said first position and a flared outer end terminating in a rim to which the ear of the user may be applied with the ear canal positioned within the rim and the ear lobe positioned outside of the rim, said chamber extending between the inner and outer ends of said tube member.

5. The attachment of claim 3, wherein said body comprises a shell member having a curved surface for holding the ear of the user away from the face portion of the earpiece.

6. An attachment for a telephone handset having an earpiece provided with a face portion having openings therein for sound transmission, said attachment comprising:
    a tube member having an inner and outer ends and a chamber through which sound may be transmitted from the inner and to the outer end, said outer end being flared and terminating in a rim configured and sized to be applied to the ear of a user with the ear canal positioned within the rim and with the ear lobe positioned outside the rim; and
    hinge means comprising an elongated, rigid arm bent between its ends, one arm end being pivotally coupled to the earpiece and the other arm end being pivotally coupled with the member for releasably mounting said tube member on the earpiece for hinged movement toward and away from the face portion of the earpiece with said inner end of the member against the face portion at a location to surround the openings, thereby transmitting sound from the openings through said chamber to the ear canal of the user, said hinge means permitting the tube member to move to a position displaced from the face portion to avoid obstruction thereof.

7. An attachment for a telephone handset having an earpiece provided with a face portion having openings therein for sound transmission, said attachment comprising:
- a tube member having an inner and outer ends and a chamber through which sound may be transmitted from the inner end to the outer end, said outer end being flared and terminating in a rim configured and sized to be applied to the ear of a user with the ear canal positioned within the rim and with the ear lobe positioned outside of the rim; and
- an annular magnet secured to the inner end of the member for releasably mounting said tube member on the earpiece with said inner end positioned against the face portion at a location to surround the openings, thereby transmitting sound from the openings through the annular magnet and said chamber to the ear canal of the user.

8. An attachment for a telephone handset which includes an earpiece having a circular face portion presenting openings therein for sound transmission, said attachment comprising:
- a body configured to present a chamber through which sound may be transmitted;
- hinge means comprising a flexible strap having opposite ends respectively connected with the handset and the body for mounting said body on the handset in a manner permitting the body hinged movement between a first position wherein said chamber is adjacent the face portion to permit sound from the openings to pass through the chamber and a second position wherein said body is displaced from the face portion, said body being disposed to be engaged by the ear of the user when said body is in the first position thereof with the ear held away from the face portion by said body and with the ear canal adjacent said chamber to receive sound therefrom;
- said body being sized and configured to engage the handset in the first position only within the confines of the face portion.

* * * * *